United States Patent [19]
Korhonen et al.

[11] Patent Number: 5,369,785
[45] Date of Patent: Nov. 29, 1994

[54] METHOD OF AND APPARATUS FOR DETECTING A MONITORING SIGNAL AT A BASE STATION IN A RADIO TELEPHONE SYSTEM

[75] Inventors: Jukka Korhonen; Pertti Huttunen, both of Oulu, Finland

[73] Assignee: Telenokia Oy, Espoo, Finland

[21] Appl. No.: 915,981

[22] Filed: Oct. 5, 1992

[30] Foreign Application Priority Data

Feb. 8, 1990 [FI] Finland .................. 900619

[51] Int. Cl.$^5$ ............................ H04B 7/26
[52] U.S. Cl. .................. 455/54.1; 455/67.1; 455/226.2; 455/307
[58] Field of Search .......... 455/67.1, 54.1, 67.4, 455/214, 226.2, 226.3, 200.1, 307, 206, 182.3, 186.1, 226.1, 266, 67.3

[56] References Cited

U.S. PATENT DOCUMENTS

| | | | |
|---|---|---|---|
| 4,249,261 | 3/1981 | Ogita | 455/206 |
| 4,291,414 | 9/1981 | Kinoshita | 455/186.1 |
| 4,458,207 | 7/1984 | Favreau et al. | 455/266 |
| 4,528,698 | 7/1985 | Fraser | 455/266 |
| 4,922,509 | 5/1990 | Tressetet . | |

FOREIGN PATENT DOCUMENTS 164108 12/1985 European Pat. Off. .
3132479 3/1983 Germany .

*Primary Examiner*—Edward F. Urban
*Assistant Examiner*—Philip J. Sobutka
*Attorney, Agent, or Firm*—Cushman Darby & Cushman

[57] ABSTRACT

A method and an apparatus for identification of a monitoring signal at a base station in a radio telephone system, in which a number of monitoring signals having different frequencies are used for monitoring the quality of radio links between the base station and mobile stations. The apparatus includes a multipath-type bandpass filter having an adjustable bandwidth for filtering the monitoring signal, the filter being arranged to be adapted to a desired monitoring signal frequency and the bandwidth of the filter being arranged to be narrowed in a steplike manner during the filtration period. An indicator is provided for identifying the monitoring signal on the basis of the level of the bandpass-filtered signal.

10 Claims, 2 Drawing Sheets

METHOD OF AND APPARATUS FOR DETECTING A MONITORING SIGNAL AT A BASE STATION IN A RADIO TELEPHONE SYSTEM

Method of and apparatus for identification of a monitoring signal at a base station in a radio telephone system.

BACKGROUND OF THE INVENTION

The invention relates to a method of and an apparatus for identification of a monitoring signal at a base station in a radio telephone system, in which a number of monitoring signals having different frequencies are used for monitoring the quality of radio links between the base station and mobile stations.

In the Nordic Mobile Telephone (NMT) system, the quality of the radio link between a base station and a mobile telephone is monitored by means of special monitoring signals. The base station generates a monitoring signal having a desired monitoring signal frequency. The NMT system utilizes four monitoring signal frequencies at intervals of 30 Hz. The base station transmits a monitoring signal to a mobile telephone which returns the monitoring signal immediately to the base station, and the base station determines the quality of the used radio link, especially the signal-noise ratio, by means of the received monitoring signal.

The base station also measures the frequency of the received monitoring signal to ensure that measures the right mobile station. For identification purposes, it is sufficient to know whether the frequency is the right one or some of the other four possible frequencies. The base station has to identify the frequency of the monitoring signal it has received during one signalling frame, in practice, however, in about 100 ms.

In one prior art solution, the monitoring signal from the receiver of the base station is applied through bandpass and high-pass filters and control switches to a mixer which mixes the received monitoring signal with an injection signal generated by the base station and having a frequency which is at an interval of 60 Hz from the monitoring signal to be received. The output signal of the mixer is applied to a 60 Hz bandpass filter and further through rectifying means to a comparator circuit in which the obtained direct voltage is compared with a preset reference voltage. If the received monitoring signal is the right one, the direct voltage proportional to the signal exceeds the reference value and the state of the output of the comparator circuit is changed. If the received monitoring signal is not the right one, the rectified voltage does not exceed the value of the reference voltage, and the state of the output of the comparator circuit remains unchanged.

A drawback of this prior art method is the deterioration in the S/N ratio occurring in the mixing at low signal levels to be used when noise increases. The narrow 60 Hz bandpass filter accomplished with discrete components is sensitive to variation in component values and thus hampers the adjustment of the reference voltage level. In addition, this prior art arrangement is highly critical with respect to the field intensity, since the greater the amount of noise present in the received monitoring signal, the narrower the bandwidth (and the longer the rise time) required from the bandpass filter, keeping in mind, however, that the measuring time should not exceed 100 ms.

SUMMARY OF THE INVENTION

The object of the present invention is to provide a method and an apparatus for identifying a monitoring signal while avoiding the above-mentioned problems and drawbacks.

This is achieved by means of a method described in the first paragraph of this specification, which according to the invention is characterized in that the method comprises filtration of the monitoring signal received by the base station by means of a bandpass filter having an adjustable bandwidth and adapted to a desired monitoring signal frequency, the bandwidth of the filter being narrowed during the filtration period; and identification of the monitoring signal on the basis of the level of the filtered signal. In the method of the invention, the received monitoring signal is applied directly, without mixing, to a narrow-band bandpass filter having an adjustable bandwidth, preferably a so-called multipath filter. The center frequency of this filter is preset to a monitoring signal frequency to be received. In the preferred embodiment of the invention, adaptability is achieved in such a manner that the frequency of the clock signal controlling the filter is dependent on the monitoring signal frequency. The rise time of the bandpass filter is reduced by narrowing the bandwidth of the filter in a steplike manner during filtration, so that the time available for filtration, about 100 ms, can be utilized in an optimal manner. The filtration of the signal is thereby started with the widest bandwidth of the filter and the bandwidth is narrowed after x % of the rise time corresponding to the above-mentioned widest bandwidth has elapsed. Correspondingly, the bandwidth is narrowed to its final value after y % of the rise time corresponding to said second widest bandwidth has elapsed.

The omission of the mixing step further provides an improved S/N ratio of the received signal in the detection of signal level, elimination of the 60 Hz bandpass filter, and avoidance of problems caused by component variation. In addition, the level of integration can be increased by the use of a multipath filter.

The invention also relates to an apparatus for practicing the method.

BRIEF DESCRIPTION OF THE DRAWINGS

The invention will now be described in greater detail by means of embodiments with reference to the attached drawings, in which.

DETAILED DESCRIPTION

The NMT system is a so-called cellular telephone system in which a geographical area covered by the system is divided into smaller, adjoining geographical areas or cells each comprising one or more fixed base stations in communication with mobile telephones within the cell. The structure of the NMT system will not be described in greater detail herein; instead, the following publications are referred to:

[1] NMT Doc.4.1981 Technical Specification for the Base Station Equipment

[2] NMT Doc.900-4 Technical Specification for the Base Station Equipment

[3] Addendum to NMT Doc.900-4 Revised 1988-04-01.

[4] NMT Doc. 900-1.

The above specifications are also referred to with regard to the signalling between The base station and the mobile telephone, and especially with regard to the monitoring signals.

Figure 1:
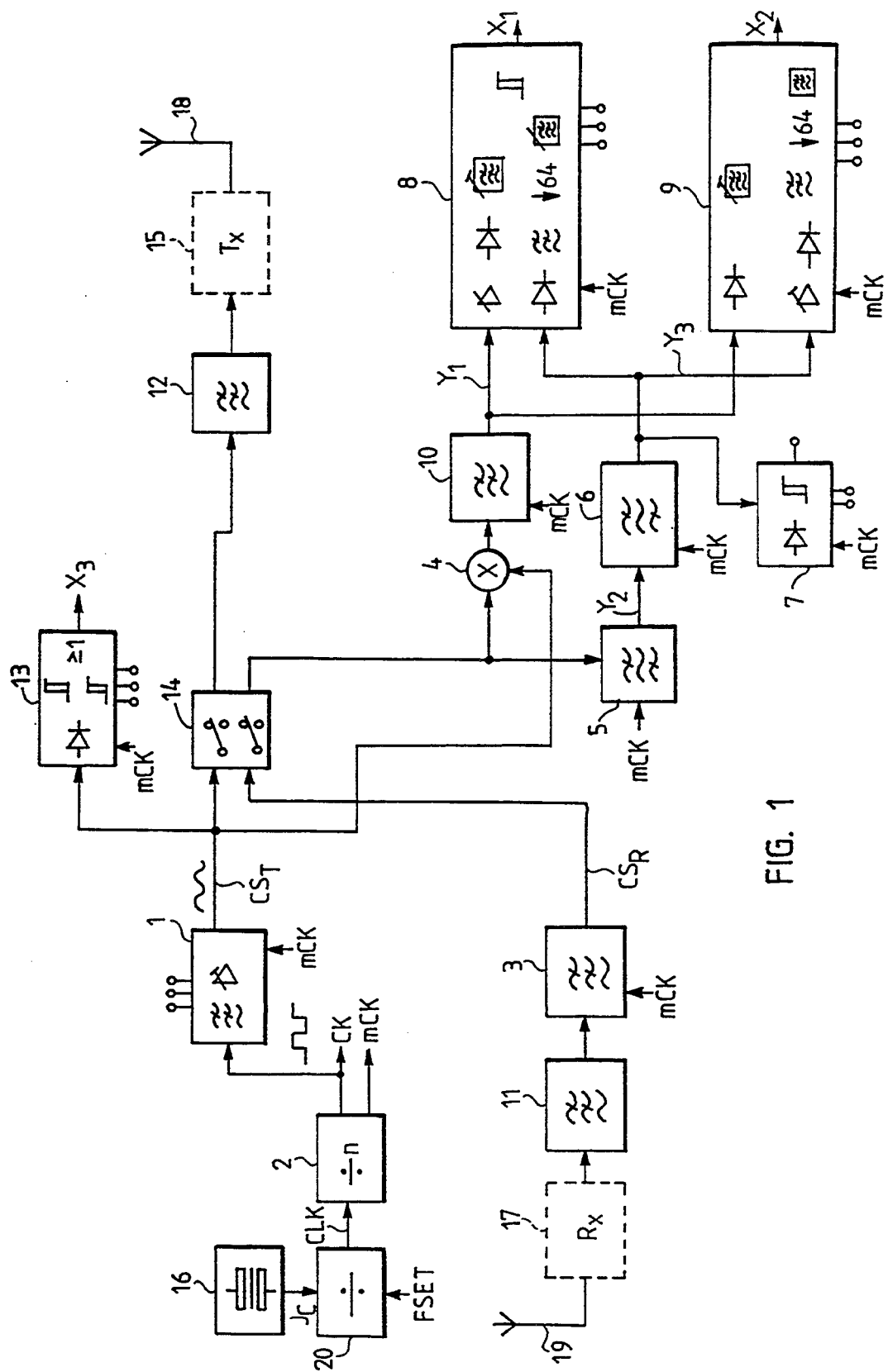
FIG. 1 is a block diagram of a base station portion required for the processing of monitoring signals.

Referring to FIG. 1, the generation of monitoring signals at the base station will be discussed first. A clock signal source, such as a crystal oscillator 16, applies a clock signal $f_c$ to an adjustable divider circuit 20 which divides the clock signal $f_c$ by a divisor determined by a frequency setting signal FSET, thus forming a primary clock signal CLK. The primary clock signal CLK is divided with a fixed divider circuit which produces a rectangular wave signal CK having the monitoring signal frequency and one or more filtration clock signals mCK the frequency of which is preferably the multiple of the frequency of the signal CK. The rectangular wave signal CK is low-pass filtered by a low-pass filtration block 1 which is preferably a Switched capacitor low-pass filter including level adjustment. An output signal from the filtration block 1 is a sinusoidal monitoring signal $CS_T$, which in normal operation is applied through a switch unit 14 to a low-pass filter 12 from which the monitoring signal is applied to a transmitter unit 15 at the base station to be transmitted through a transmitter antenna 18 to a mobile station. The level of the transmitted monitoring signal is observed by means of a level indicator 13.

The monitoring signal returned from the mobile station and received at the base station by a receiver antenna 19 and a receiver portion 17 is filtered by a low-pass filter 11 which limits the upper end of the frequency band of the monitoring signal so as to prevent aliasing at subsequent stages. An output signal from the filter 11 is filtered by a bandpass filter 3, which is preferably a Switched capacitor filter, to make the monitoring signal more distinguishable from the noise. The monitoring signal $CS_R$ received from the filter 3 is applied through the switch unit 14 to a mixer 4 and a bandpass filter 5.

In the mixer 4, the received monitoring signal $CS_R$ is mixed with the transmitted monitoring signal $CS_T$ or another injection signal having the monitoring signal frequency, whereby the difference frequency is zero and only a noise signal and the sum frequency of the mixed signals, in this case twice the monitoring signal frequency, occur at the output of the mixer. The sum frequency and the dc component are filtered from the noise signal by dc blocking and the low-pass filter 10, preferably a Switched capacitor filter, which results in the formation of a signal $Y_1$. proportional to the noise around the monitoring signal frequency.

The above is not directly related to the present invention and can thus be accomplished in various ways without deviating from the idea and scope of the present invention.

For identifying the monitoring signal according to the invention, the bandpass filter 3 applies the received monitoring signal $CS_R$ to the a multipath-type bandpass filter 5 also having an adjustable bandwidth, preferably below 1 Hz. To decrease the rise time of the filter, the filtration is, however, started with a proportionally wider bandwidth from which the bandwidth is narrowed in a steplike manner to a suitable value in 100 ms. The bandpass filter 5 is controlled by means of the above-mentioned clock signal mCK, which determines its center frequency. On receiving the monitoring signal, the filter has thus already been adapted to the right monitoring signal frequency, as the clock signal mCK is dependent on the frequency of the monitoring signal.

The filtration of the monitoring signal is started with the widest band of the bandpass filter 5, whereafter the bandwidth is narrowed for the first time after x % of the filter rise time corresponding to the widest bandwidth has elapsed. Correspondingly, after y % of the rise time corresponding to this second widest bandwidth has elapsed, the bandwidth is changed to its final narrowest value. The band pass filter 5 filters noise from the received monitoring signal $CS_R$, a pure monitoring signal $Y_2$ being obtained as a result. The signal $Y_2$ is further bandpass filtered by a bandpass filter 6 which is preferably a Switched capacitor filter and which has a wider passband than the filter 5, so as to filter the harmonic frequencies formed in the filter 5 from the signal $Y_2$. The filter 6 is also controlled by the above-mentioned clock signal mCK.

The output signal $Y_3$ of the filter 6 is applied to an indicator block 7 comprising a peak value indicator and a rectifier as well as a comparator circuit. The rectifier of the indicator block 7 rectifies the filtered monitoring signal $Y_3$ and the subsequent comparator circuit compares the obtained dc voltage with a preset reference voltage value. The signal is identified if the dc voltage exceeds this reference voltage value.

For observing the quality of the used radio link, the output signal $Y_3$ of the filter 6 and the noise signal $Y_1$ are both applied to two signal processing blocks 8 and 9 in which the signal is amplified, rectified, low-pass filtered, decimated, integrated and finally the dc voltages proportional to the signals are compared. In the blocks 8 and 9, all the filter operations are preferably also accomplished by Switched capacitor filters controlled by the above-mentioned clock frequency mCK. This signal processing portion is not either directly related to the present invention, and it can be accomplished in various ways without deviating from the scope of the invention.

As to the theory of the multipath filter technique applied in the bandpass filter 5 of FIG. 1, the following publications are referred to:

[5] "Analog MOS Integrated Circuits for Signal Processing", R. Gregorian & G. C. Temes, Wiley, 1986 (p.363–387)

[6] "Multirate Digital Signal Processing", R. E. Crochiere & L. R. Rabiner, Prentice-Hall, 1983 (p. 79–83).

Figure 2:
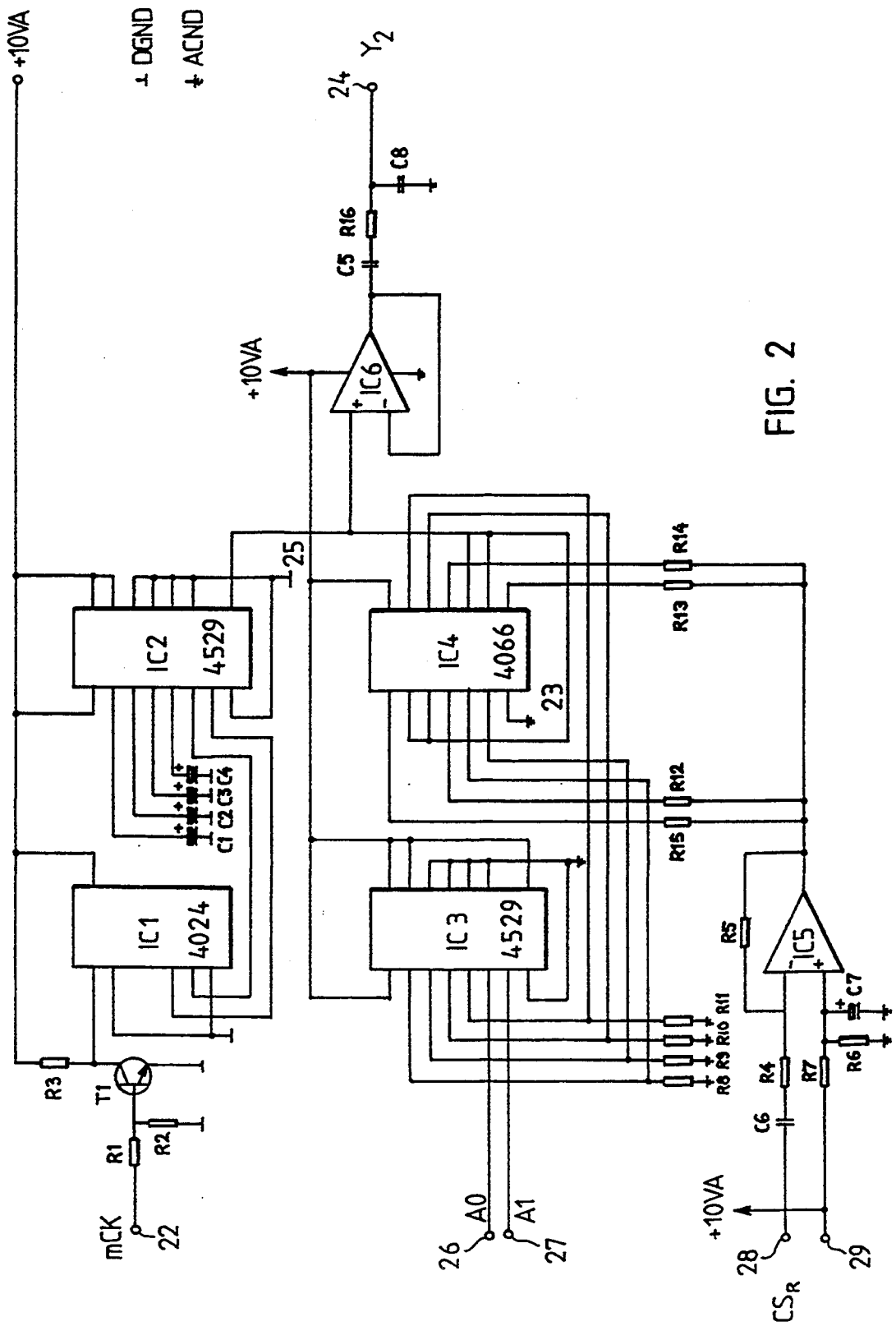
FIG. 2 is a circuit diagram of a multipath filter used in the apparatus of FIG. 1.

FIG. 2 shows a circuit diagram for the bandpass filter 5 used in the preferred embodiment of the invention.

The clock frequency of the filter, and thus the clock signal mCK determining the center frequency of the filter and to be applied to a terminal 22, is subjected to level shifting at a transistor stage T1, whereafter it is applied to a divider circuit IC1 from which divided clock frequencies controlling a multiplexer C2 are obtained. The received monitoring signal applied to a terminal 28 is amplified at an amplification state IC5 and further applied through resistors R12–R15 to a switch unit IC4 and through a multiplexer IC2 and an output amplifier IC6 to an output terminal 24. The function of a control circuit IC3 is to control the switch unit IC4 so as to connect a desired resistance in accordance with control signals A0 and A1. One path or RC loop of the multipath filter formed by the described coupling arrangement is formed by the resistor combination R12–R15 and one of the capacitors C1–C4. The bandwidth of the RC bandpass filter so obtained can be varied by varying the combination of the control signals A0 and A1, whereby the control circuit IC3 controls the switch unit IC4 so that the resistors R12–R15 connected in parallel are coupled either to the signal path or disconnected from it, thus changing the value of the connected total resistance and thus the circular frequency of the RC loop and the bandwidth of the multipath filter.

The drawings and the description related to them are only intended to illustrate the present invention. In their detail, the apparatus and the method of the present invention may vary within the scope of the attached claims.

We claim:

1. A method for monitoring the quality of radio links between a base station and a mobile station in a radio telephone system, comprising:
   (a) receiving a monitoring signal having a predetermined frequency at a base station;
   (b) tuning a center frequency of an adjustable bandwidth-type bandpass filter to said predetermined frequency and thereby providing a tuned bandpass filter having a given bandwidth;
   (c) filtering said monitoring signal received at the base station using said tuned bandpass filter and thereby providing an output signal;
   (d) narrowing said given bandwidth of said tuned bandpass filter during said filtering, the filtering being started with the widest bandwidth of the filter, whereby the bandwidth is narrowed when a first portion of a rise time corresponding to the widest bandwidth has elapsed, and the bandwidth is changed to a final value thereof when a second portion of said rise time has elapsed; and
   (e) detecting the presence of said monitoring signal on the basis of the level of said output signal of said tuned bandpass filter.

2. The method of claim 1, wherein:
   in step (d) the bandwidth of the filter is narrowed stepwise.

3. The method of claim 2, further comprising as part of step (d):
   detecting the peak value of the output signal; and
   comparing the detected peak value with a predetermined threshold value.

4. The method of claim 1, further comprising as part of step (d):
   detecting the peak value of the output signal; and
   comparing the detected peak value with a predetermined threshold value.

5. The method of claim 1, further comprising as part of step (d):
   detecting the peak value of the output signal; and
   comparing the detected peak value with a predetermined threshold value.

6. The method of claim 1, wherein:
   each instance of said filtering is carried out for a period of no more than 150 ms.

7. Apparatus for monitoring the quality of radio links between a base station and a mobile station in a radio telephone system, comprising:
   means for receiving a monitoring signal having a predetermined frequency;
   a tuneable multipath-type bandpass filter having an adjustable bandwidth for filtering said received monitoring signal and providing an output signal which is affected in level thereby, the filter being adapted to be tuned to said predetermined frequency,
   means for narrowing the bandwidth of said bandpass filter stepwise during said filtering, such that the filtering is started with the widest bandwidth of the filter, the bandwidth is narrowed when a first portion of a rise time corresponding to the widest bandwidth has elapsed, and the bandwidth is changed to a final value thereof when a second portion of said rise time has elapsed; and
   a detector means for detecting the presence of said monitoring signal on the basis of the level of said output signal of said bandpass filter.

8. The apparatus of claim 7, wherein:
   said detector means comprises means for rectifying the output signal of said bandpass filter and a comparator means for comparing an output voltage of said rectifying means with a predetermined threshold value.

9. The apparatus of claim 8, wherein:
   said bandpass filter is arranged to provide a filtration period of no more than 150 ms.

10. The apparatus of claim 7, wherein:
   said bandpass filter is arranged to provide a filtration period of no more than 150 ms.

* * * * *

UNITED STATES PATENT AND TRADEMARK OFFICE
CERTIFICATE OF CORRECTION

PATENT NO. : 5,369,785
DATED : November 29, 1994
INVENTOR(S) : Korhohnen et al

It is certified that error appears in the above-indentified patent and that said Letters Patent is hereby corrected as shown below:

```
On the title page, insert PCT information as follows:
--[22]  PCT Filed:   Feb. 6, 1991
  [86]  PCT No.:     PCT/FI91/00036
        § 371 Date:  Oct. 5, 1992
        § 102(e) Date: Oct. 5, 1992
  [87]  PCT Pub. No. WO91/12676
        PCT Pub. Date: August 22, 1991--.
```

Signed and Sealed this

Twenty-fifth Day of April, 1995

Attest:

BRUCE LEHMAN

*Attesting Officer*    *Commissioner of Patents and Trademarks*